(12) United States Patent
Ngai et al.

(10) Patent No.: US 10,859,700 B2
(45) Date of Patent: Dec. 8, 2020

(54) SYSTEMS, DEVICES, AND/OR METHODS FOR ENCODED TIME OF FLIGHT LIGHT DETECTION AND RANGING

(71) Applicant: Z-SENZ LLC, Oak Shade Rd, MD (US)

(72) Inventors: Darryl Ngai, Bethesda, MD (US); Christopher Brown, Gaithersburg, MD (US)

(*) Notice: Subject to any disclaimer, the term of this patent is extended or adjusted under 35 U.S.C. 154(b) by 559 days.

(21) Appl. No.: 15/656,901

(22) Filed: Jul. 21, 2017

(65) Prior Publication Data

US 2018/0031703 A1    Feb. 1, 2018

Related U.S. Application Data

(60) Provisional application No. 62/365,300, filed on Jul. 21, 2016.

(51) Int. Cl.
*G01S 17/10* (2020.01)
*G01S 7/484* (2006.01)
*G01S 7/497* (2006.01)

(52) U.S. Cl.
CPC .............. *G01S 17/10* (2013.01); *G01S 7/484* (2013.01); *G01S 7/497* (2013.01)

(58) Field of Classification Search
CPC ........ G01S 17/894; G01S 17/89; G01S 7/484; G01S 17/10; G01S 7/4816; G01S 17/931; G01S 7/4863; G01S 7/486
See application file for complete search history.

(56) References Cited

U.S. PATENT DOCUMENTS

| | | | |
|---|---|---|---|
| 2016/0003946 A1* | 1/2016 | Gilliland | G01S 17/894 356/5.01 |
| 2016/0245919 A1* | 8/2016 | Kalscheur | G01S 17/89 |
| 2017/0016981 A1* | 1/2017 | Hinderling | G01S 17/10 |
| 2017/0184399 A1* | 6/2017 | Thayer | G01C 13/008 |

* cited by examiner

*Primary Examiner* — Luke D Ratcliffe
(74) *Attorney, Agent, or Firm* — Dale Jensen, PLC; Dale Jensen

(57) ABSTRACT

Certain exemplary embodiments can provide an instrument comprising a signal generator. The signal generator is constructed to generate a temporally distinct profile of LIDAR pulses and a reference signal. The instrument comprises a light source coupled to the signal generator. The light source constructed to receive the temporally distinct profile of LIDAR pulses and output corresponding light pulses with temporal spacing substantially equal to those of temporally distinct profile.

19 Claims, 15 Drawing Sheets

SYSTEMS, DEVICES, AND/OR METHODS FOR ENCODED TIME OF FLIGHT LIGHT DETECTION AND RANGING

CROSS-REFERENCES TO RELATED APPLICATIONS

This application claims priority to, and incorporates by reference herein in its entirety, U.S. Provisional Patent Application Ser. No. 62/365,300, filed Jul. 21, 2016.

STATEMENT REGARDING FEDERALLY SPONSORED RESEARCH

This patent application is for technology made with United States government support through the Small Business Innovation Research (SBIR) program. The United States government has certain rights in this patent application.

BACKGROUND

Time of flight ("TOF") light detection and ranging ("LIDAR") is a technique for remote distance measurement. TOF LIDAR sensors determine a distance between an instrument comprising a sensor and an object by measuring a time required for a laser pulse to travel between the instrument and the object. LIDAR is used in a wide range of applications such as mapping, surveying, atmospheric measurements, robotics, autonomous vehicles, and law enforcement. The data acquisition rate of LIDAR is limited by the TOF between the LIDAR instrument and the object due to the fixed speed of light. If the pulse rate from the instrument is increased so that more than one pulse is traveling between the instrument and the distant target at a time, confusion between return pulses can occur leading to incorrect measurements of distance between the sensor and the object. Additionally, range and accuracy of LIDAR instrumentation can be limited by environmental noise, cross talk between multiple LIDAR sensors, and instrumental noise in the detected signal.

Accordingly, advances in methods and equipment for enabling TOF LIDAR to perform multiple distance measurements concurrently with an encoding and decoding technique, while reducing the susceptibility to environmental, cross talk between multiple LIDAR sensors, or instrumental noise would be advantageous and received favorably in the art.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide an instrument comprising a signal generator. The signal generator is constructed to generate a temporally distinct profile of LIDAR pulses and a reference signal. The instrument comprises a light source coupled to the signal generator. The light source constructed to receive the temporally distinct profile of LIDAR pulses and output corresponding light pulses with temporal spacing substantially equal to those of temporally distinct profile.

A TOF LIDAR instrument determines the distance between the instrument and an object by measuring time difference between a time of a pulse of light from the instrument and a time when reflected light from the object returns to a sensor comprised by the instrument; which reflected light is reflected from the pulse of light. The distance between the instrument and the object can be calculated from formula (1):

$$d = cT/2n, \qquad (1).$$

Where the distance d to an object is determined from a measurement of the time T required for a light pulse to travel from the instrument, reflected from an object, and return to the instrument and the known speed of light, c, and the index of refraction of the medium through which the light passes, n.

FIGS. 1A, 1B, 1C, 1D, and 1E are exemplary embodiments of a LIDAR distance sensing instrument capable of using the encoded TOF LIDAR technique.

Figure 1A:
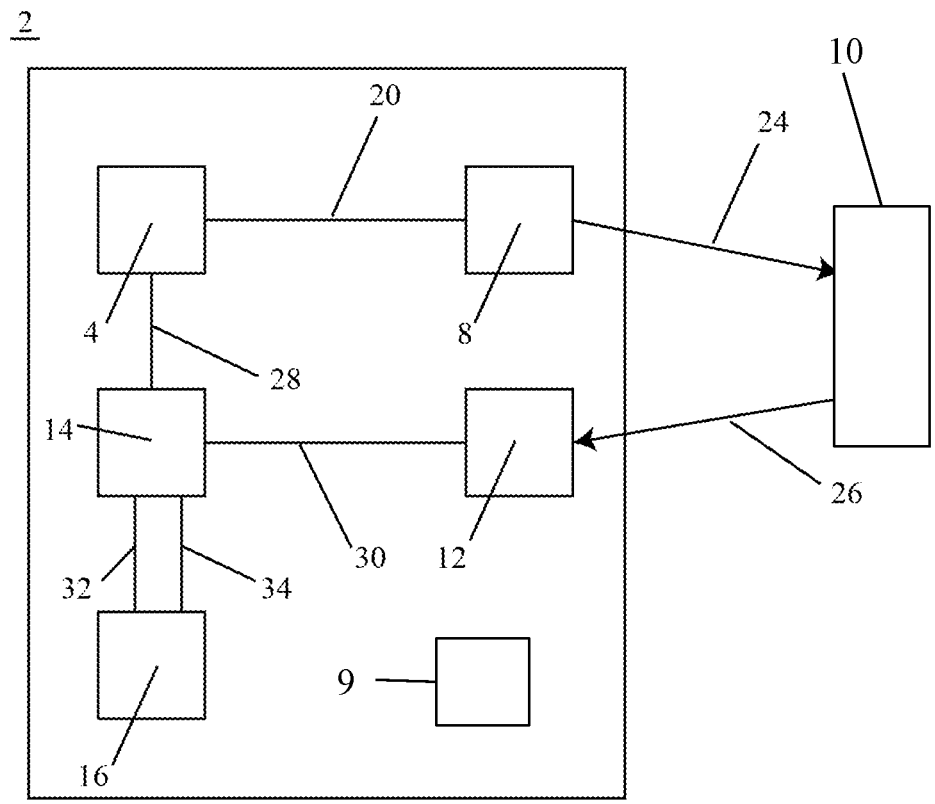
FIGS. 1A, 1B, 1C, 1D, and 1E are exemplary embodiments of a LIDAR distance sensing instrument capable of using the encoded TOF LIDAR technique.

In exemplary embodiments, as shown in FIGS. 1A, (LIDAR distance sensing instrument), 1B (LIDAR distance sensing instrument with trigger signal from processor), 1C (LIDAR distance sensing instrument with trigger signal and reference signal from processor), 1D (LIDAR distance sensing instrument with integrated multiprocessor), and 1E (integrated multiprocessor).

In an embodiment, as shown in FIG. 1A, LIDAR distance sensing instrument 2 comprises signal generator 4, light source 8, detector 12, signal analyzer 14, and processor 16. Signal generator 4 can comprise, e.g., a pulse pattern generator, waveform generator, and/or the like. Signal generator 4 creates temporally distinct profile 20, which is communicated to light source 8, which generates output light pulses 24 with temporal spacing substantially equal to those of temporally distinct profile 20. Light source 8 comprises a laser, LED, flash bulb, and/or the like, and can also comprise power supplies and other parts constructed to generate output light pulse 24. Output light pulse 24 reflects from an object and a reflected light pulse 26 can be measured by detector 12. Detector 12 generates detected signal 30 corresponding to the measured reflected light pulse 26. Detected signal 30 is communicated from detector 12 to signal analyzer 14. Signal generator 4 outputs reference signal 28, which is substantially the same as temporally distinct profile 20, which is used as a reference by signal analyzer 14. Signal analyzer 14 generates decoded output 32 and decoded input 34, which are the decoding of reference signal 28 and detected signal 30 respectively. Decoded output 32 and decoded input 34 are inputs into processor 16. Processor 16 can be an information device and/or can comprise a microprocessor, which analyzes decoded output 32 and decoded input 34 to determine the distance of environmental objects in real time, or a storage device, which can store data for transfer to an information device for later analysis.

Figure 1B:
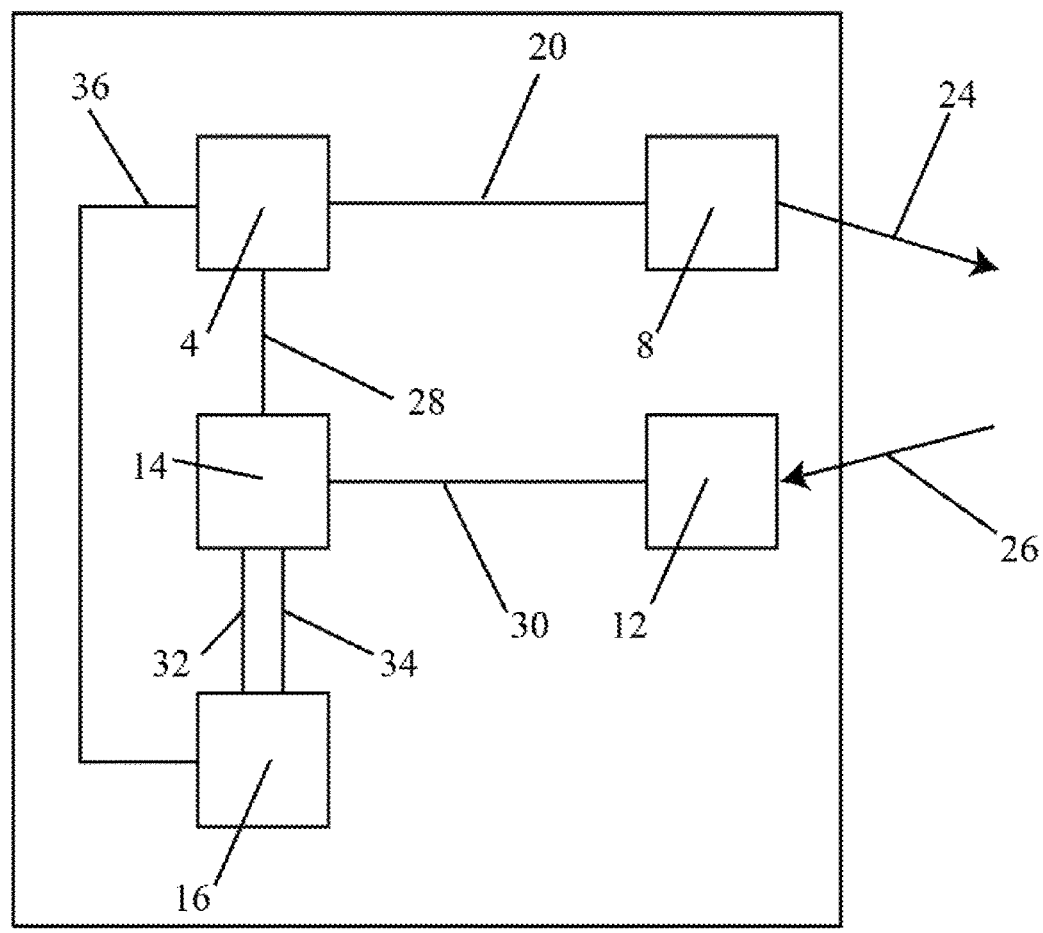

As shown in FIG. 1B, LIDAR distance sensing instrument 2 comprises signal generator 4, light source 8, detector 12, signal analyzer 14, and processor 16. Signal generator 4 creates temporally distinct profile 20 when actuated by trigger signal 36 from processor 16. Temporally distinct profile 20 is communicated to light source 8, which generates output light pulses 24 having a temporal spacing substantially equal to those of temporally distinct profile 20. Output light pulses 24 reflect from an object and reflected light pulses 26 can be measured by detector 12. Detector 12 generates detected signal 30 corresponding to the measured reflected light pulses 26. Detected signal 30 is communicated from detector 12 to signal analyzer 14. Signal generator 4 outputs reference signal 28, which is substantially the same as temporally distinct profile 20, which is used as a reference by signal analyzer 14. Signal analyzer 14 generates decoded output 32 and decoded input 34, which are the decoding of reference signal 28 and detected signal 30 respectively. Decoded output 32 and decoded input 34 are inputs into processor 16. Processor 16 can be an information device and/or can comprise a microprocessor, which analyzes decoded output 32 and decoded input 34 to determine the distance of environmental objects in real time, or a storage device, which can store data for transfer to an information device for later analysis.

Figure 1C:
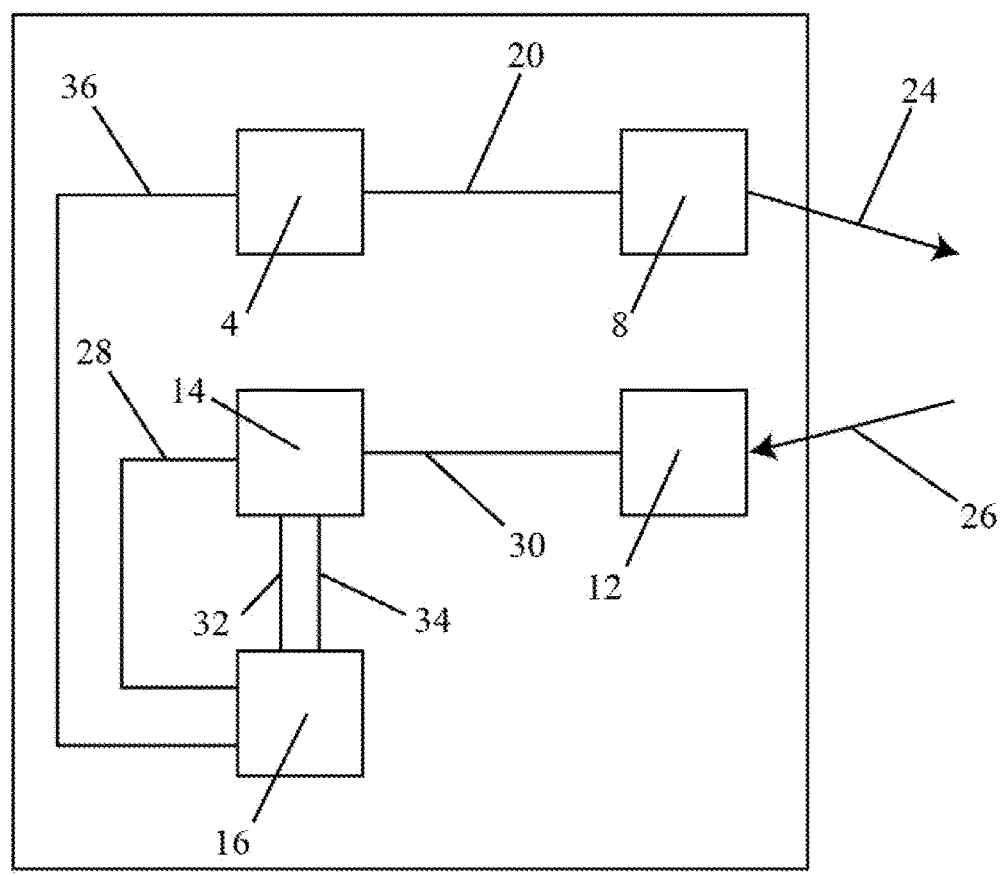

As shown in FIG. 1C, LIDAR distance sensing instrument 2 comprises signal generator 4, light source 8, detector 12, signal analyzer 14, and processor 16. Signal generator 4 creates temporally distinct profile 20 when actuated by trigger signal 36 from processor 16. Temporally distinct profile 20 is communicated to light source 8, which generates output light pulses 24 having a temporal spacing substantially equal to those of temporally distinct profile 20. Output light pulses 24 reflect from an object and reflected light pulses 26 can be measured by detector 12. Detector 12 generates detected signal 30 corresponding to the measured reflected light pulses 26. Detected signal 30 is communicated from detector 12 to signal analyzer 14. Processor 16 outputs reference signal 28, which is substantially the same as temporally distinct profile 20, which is used as a reference by signal analyzer 14. Signal analyzer 14 generates decoded output 32 and decoded input 34, which are the decoding of reference signal 28 and detected signal 30 respectively. Decoded output 32 and decoded input 34 are inputs into processor 16. Processor 16 can be an information device and/or can comprise a microprocessor, which analyzes decoded output 32 and decoded input 34 to determine the distance of environmental objects in real time, or a storage device, which can store data for transfer to an information device for later analysis.

Figure 1D:
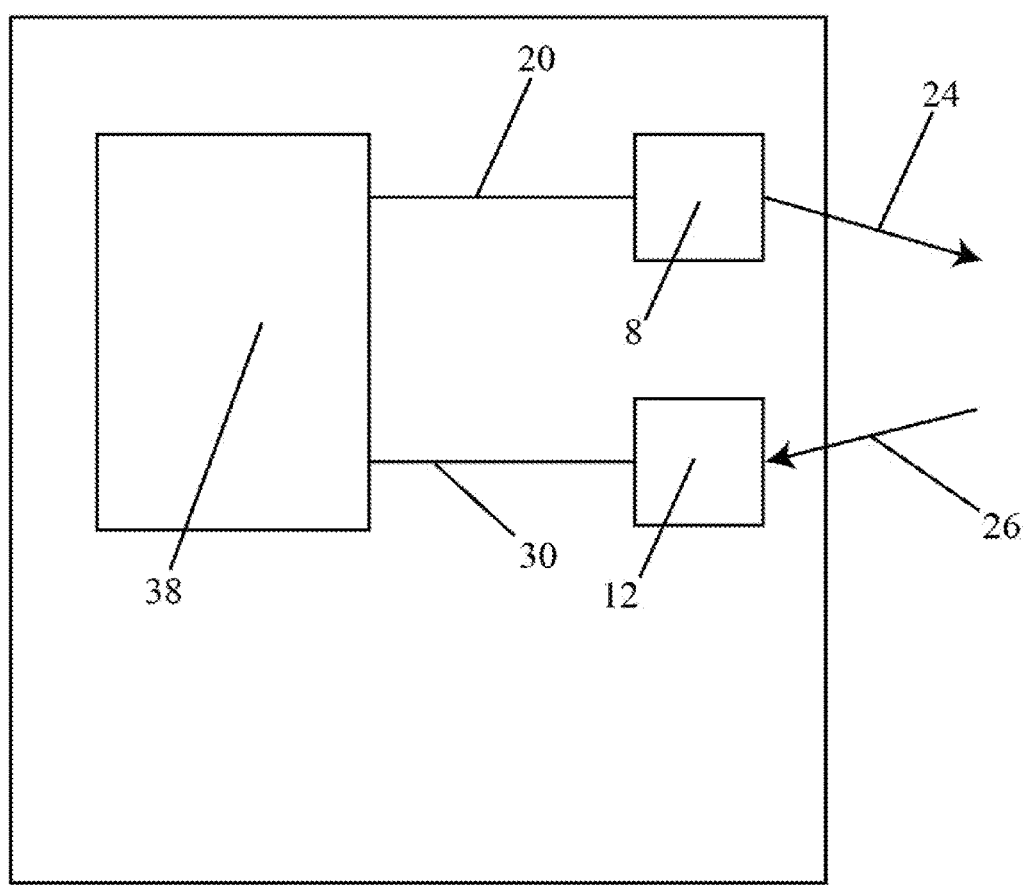

As shown in FIG. 1D, LIDAR distance sensing instrument 2 comprises integrated multiprocessor 38, light source 8, and detector 12. Integrated multiprocessor 38 creates temporally distinct profile 20. Temporally distinct profile 20 is communicated to light source 8, which generates output light pulses 24 having a temporal spacing substantially equal to those of temporally distinct profile 20. Output light pulses 24 reflect from an object and reflected light pulses 26 can be measured by detector 12. Detector 12 generates detected signal 30 corresponding to the measured reflected light pulses 26. Detected signal 30 is communicated from detector 12 to integrated multiprocessor 38.

Figure 1E:
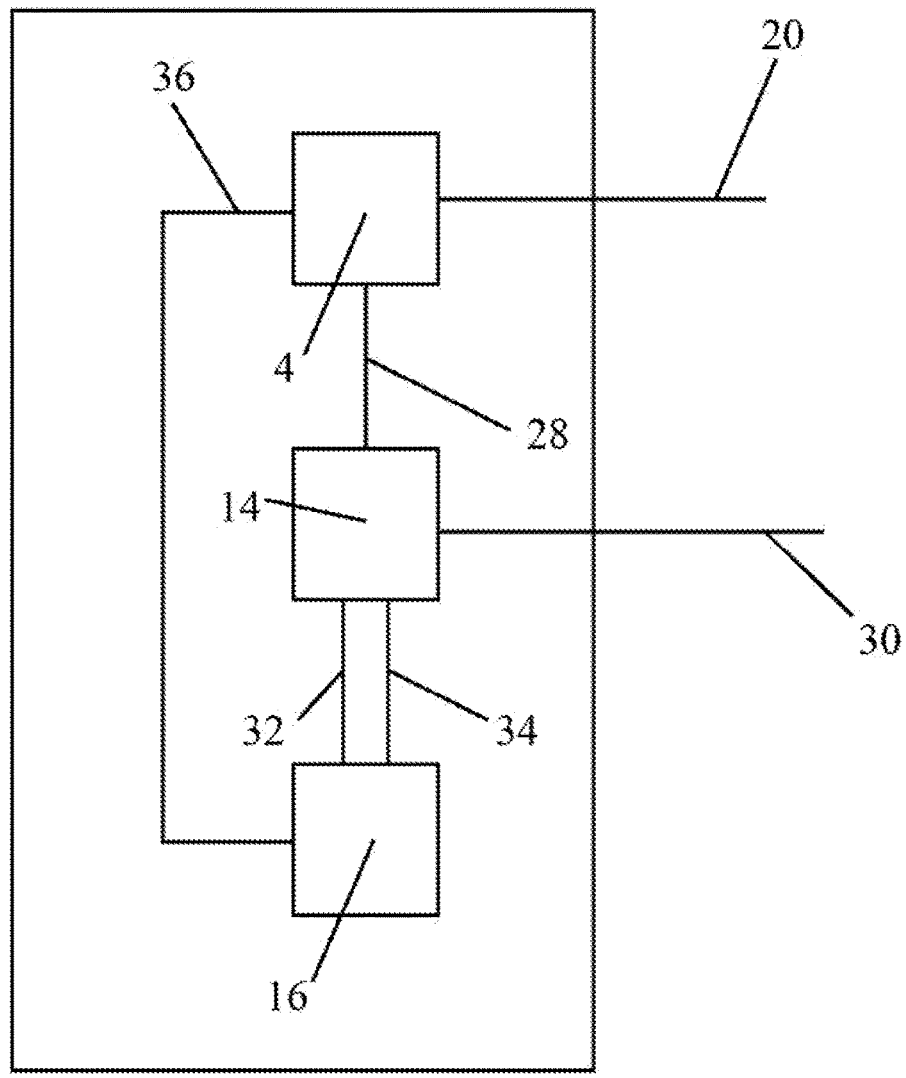

As shown in FIG. 1E, integrated multiprocessor 38 is comprised of signal generator 4, signal analyzer 14, and processor 16 in a single integrated electronic device. Signal generator 4 creates temporally distinct profile 20 when actuated by trigger signal 36 from processor 16. Temporally distinct profile 20 is communicated to instrumentation off device. Off device detected signal 30 is input into signal analyzer 14. Signal generator 4 outputs reference signal 28, which is substantially the same as temporally distinct profile 20, which is used as a reference by signal analyzer 14. Signal analyzer 14 generates decoded output 32 and decoded input 34, which are the decoding of reference signal 28 and detected signal 30 respectively. Decoded output 32 and decoded input 34 are inputs into processor 16. Processor 16 can be an information device and/or can comprise a microprocessor.

Certain exemplary embodiments can provide distance sensing instrument 2 comprising signal generator 4, which can be constructed to:
  generate temporally distinct profile 20 of LIDAR pulses; and/or
  generate reference signal 28.

Distance sensing instrument 2 comprises light source 8, which is coupled to signal generator 4. Light source 8 is constructed to receive the temporally distinct profile 20 of LIDAR pulses and output corresponding light pulses 24 with temporal spacing substantially equal to those of temporally distinct profile 20.

Distance sensing instrument 2 comprises detector 12, which is constructed to output detected signal 30 based upon reflected light pulses 26 from object 10 with a temporal spacing of reflected light pulses 26 correlated to those of temporally distinct profile 20. Distance sensing instrument 2 comprises signal analyzer 14, which is constructed to:
  generate a decoded output 32 responsive to reference signal 28; and
  generate a decoded input 34 responsive to detected signal 30; and
  transmit decoded input 34 and decoded output 32 to processor 16.

Distance sensing instrument 2 comprises processor 16, which is constructed to cause a rendering of a distance to object 10 based upon the time difference between the peaks of decoded output 32 and decoded input 34. Distance sensing instrument 2 can comprise a power supply 9 that is electrically coupled to any of the components of distance sensing instrument 2 including, without limitation, light source 8.

In certain exemplary embodiments:
  signal generator 4, signal analyzer 14 and/or processor 16 can be comprised by a single multiprocessor 38;
  instrument 2 can be comprised by a single multiprocessor 38; and/or
  reference signal 28 can be generated by signal analyzer 14.

Reference signal 28 and detected signal 30 can be autocorrelated via a determination in accordance with a formula:

$$R(\tau) = \int_{-\infty}^{\infty} s(t)s(t+\tau)dt$$

where s(t) is an intensity of detected signal 30 at time τ, and R(τ) is the autocorrelation. The autocorrelation of detected signal 30 can have a local maximum away from 0 at a temporal spacing ΔR.

An intensity of decoded output 32 can be determined via a calculation is determined via a formula:

$$D_{32}(t) = \sqrt{s_{28}(t)s_{28}(t+\Delta O)}$$

where $s_{28}(t)$ is the intensity of reference signal 28 at time t and ΔO is a temporal spacing.

An intensity of decoded input 34 via a calculation can be determined via a formula:

$$D_{34}(t) = \sqrt{s_{30}(t)s_{30}(t+\Delta O)}$$

where $s_{30}(t)$ is the intensity of detected signal 30 at time t and ΔO is a temporal spacing.

The determination of the distance to object 10 can comprise:
- a determination that a count of reflected light pulses is a multiple of a count of light pulses 24 output from the light source; and/or
- and based upon a difference of the count of reflected light pulses 26 and the count of light pulses, wherein light pulses 24 are reflected by a plurality of objects (see, e.g., object 10A and object 10B of FIG. 3A) that can comprise object 10.

Distance sensing instrument 2 can be constructed to determine a distance to each of a plurality of objects (see, e.g., object 10A and object 10B of FIG. 3A) based upon the output of corresponding light pulses with temporal spacing substantially equal to those of temporally distinct profile 20, the plurality of objects, which can comprise object 10.

The distance to object 10 can be determined based upon a formula d=cT/2n, where T is a measured time for light pulse 24 to travel from light source 8, be reflected from object 10, and return to detector 12 and c is a known speed of light, and n is the index of refraction of the medium through which the light passes.

Sets of light pulses 24 from light source 8 are matched from local maxima in autocorrelations, wherein the local maxima in an autocorrelation of a set of pulses in detected signal 30 provides values of a pulse spacing of a corresponding pulse set in reference signal 28.

Figure 2A:
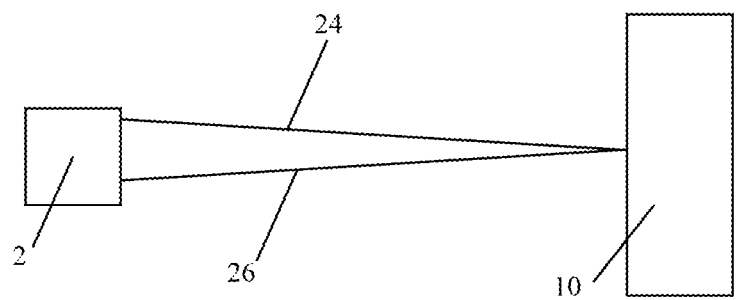
FIGS. 2A, 2B, 2C, 2D, and 2E shows a distance measurement from a LIDAR sensor to a single object using TOF LIDAR and encoded LIDAR technique.

In one embodiment, as shown in FIGS. 2A (distance measurement from the instrument to an object), 2B (input to signal analyzer 14 using TOF LIDAR, measured distance from the sensor to a single object), 2C (input to signal analyzer 14 using encoded TOF LIDAR, measured distance from the instrument to the object), 2D (autocorrelation of detected signal 30, obtained from encoded TOF LIDAR), and 2E (decoded output), LIDAR distance sensing instrument 2 emits output light pulse 24 towards object 10, which reflects the light, producing reflected light pulse 26 that are detected by LIDAR distance sensing instrument 2.

Figure 2B:
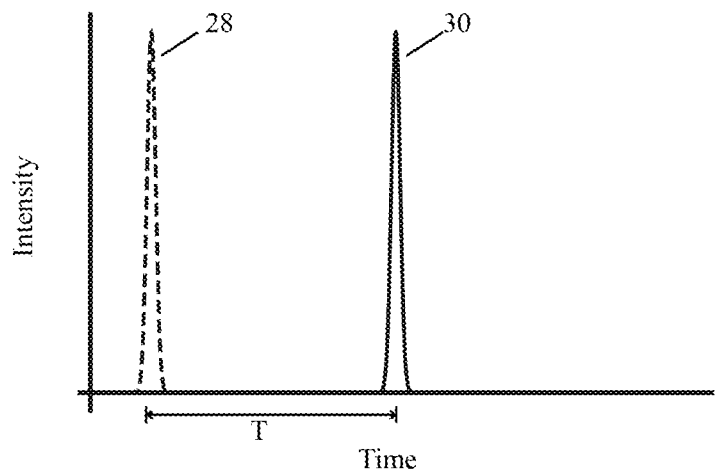

As shown in FIG. 2B, using TOF LIDAR, signal analyzer 14 has inputs of reference signal 28 and detected signal 30, which can measure the distance from LIDAR distance sensing instrument 2 to object 10 without need of decoding, according to formula (1). Each measurement with TOF LIDAR is performed using output light pulse 24 comprising a single pulse. Accordingly, reference signal 28 and detected signal 30 comprise a single pulse each.

Figure 2C:
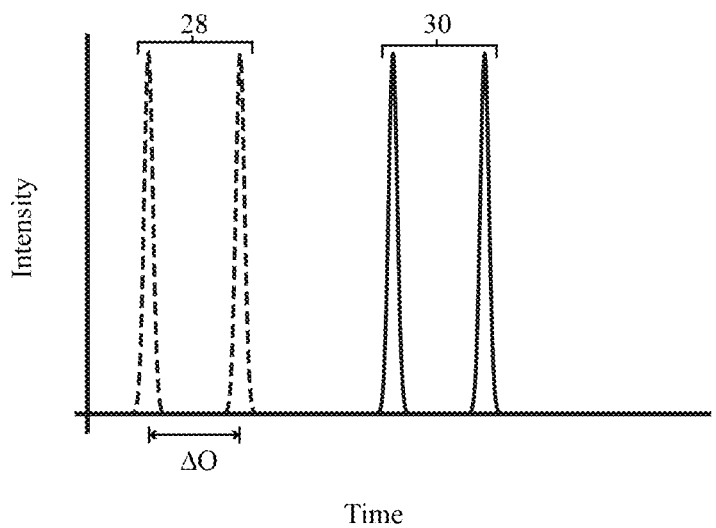

As shown in FIG. 2C, using encoded TOF LIDAR, signal analyzer 14 has inputs of reference signal 28 and detected signal 30, but requires decoding by signal analyzer 14 to determine the distance according to formula (1). Each measurement with encoded TOF LIDAR, is performed using output light pulse 24 comprising multiple pulses, where temporal spacing ΔO between pulses is known. Reflected light pulse 26 is measured comprising of multiple pulses. Accordingly, reference signal 28 and detected signal 30 comprise multiple pulses each.

In encoded TOF LIDAR, reference signal 28 comprises multiple pulses of known temporal spacing. The pulses in reference signal 28 are separated by temporal spacing ΔO. The autocorrelation of detected signal 30 can be determined by formula (2)

$$R(\tau) = \int_{-\infty}^{\infty} s(t)s(t+\tau)dt, \qquad (2).$$

Where s(t) is the intensity of detected signal 30 at time t, and R(τ) is the autocorrelation. The local maxima of R (τ) away from 0 is at temporal spacing ΔR. Temporal spacing ΔO and temporal spacing ΔR have the same value, which shows that detected signal 30 corresponds to reference signal 28. When multiple measurements are performed, each with varying values of temporal spacing ΔO, detected signal 30 can be matched to reference 28 by finding the temporal spacing ΔO which equals temporal spacing ΔR.

Figure 2D:
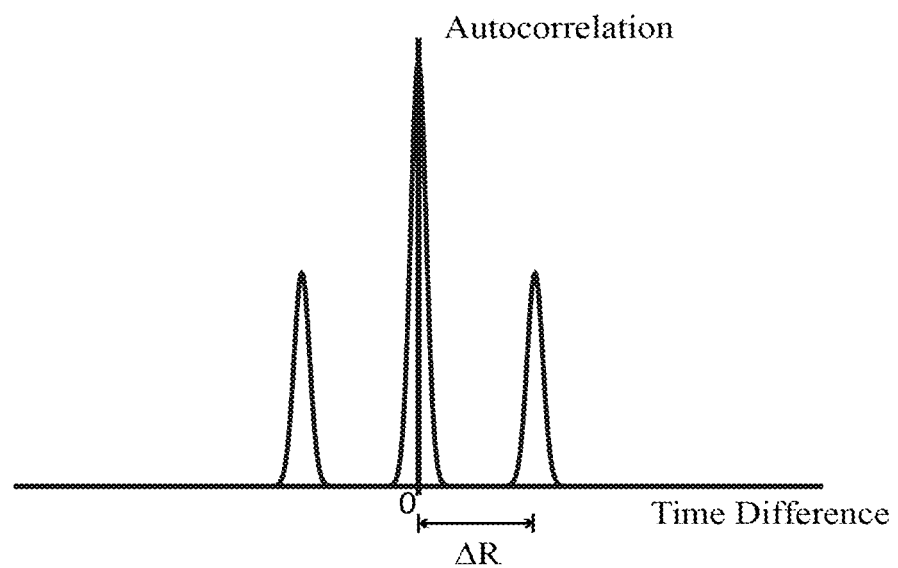

As shown in FIG. 2D, the autocorrelation of detected signal 30 from FIG. 2C has a local maximum away from 0 at temporal spacing ΔR.

To decode the matched reference signal 28 and detected signal 30, the known value of temporal spacing ΔO can be used. The decoded signal can be calculated via formulas (3) and (4):

$$D_{32}(t) = \sqrt{s_{28}(t)s_{28}(t+\Delta O)} \qquad (3)$$

$$D_{34}(t) = \sqrt{s_{30}(t)s_{30}(t+\Delta O)} \qquad (4).$$

Where $s_{28}(t)$ and $s_{30}(t)$ is the intensity of reference signal 28 and detected signal 30 respectively and $D_{32}(t)$ and $D_{34}(t)$ are the intensity of decoded output 32 and decoded input 34 respectively.

Figure 2E:
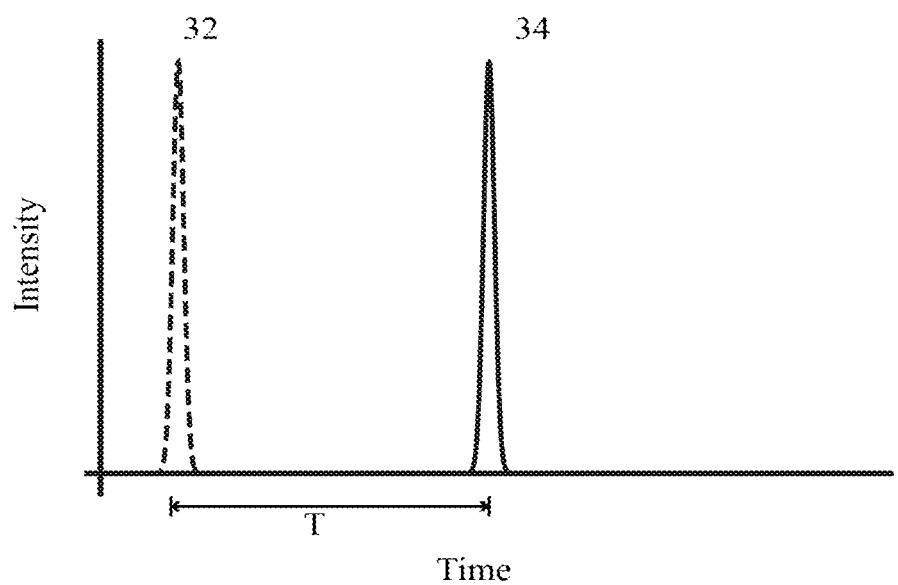

As shown in FIG. 2E, decoded output 32 and decoded input 34 are calculated. Temporal difference T is the time difference between the peaks of decoded output 32 and decoded input 34, which provides a measure of distance.

Figure 3A:
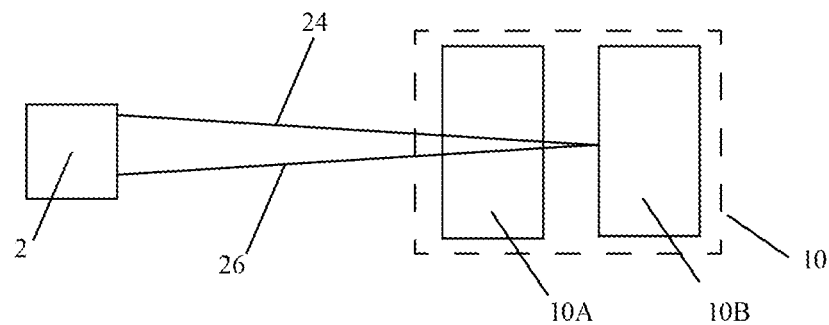
FIGS. 3A, 3B, 3C, 3D, and 3E show a distance measurement from a LIDAR sensor to an object or group of objects that generates multiple return signals using TOF LIDAR and encoded LIDAR technique.

In one embodiment, as shown in FIGS. 3A (distance measurement from a single object and/or distance measurement from an object with two reflective elements), 3B (input to signal analyzer 14 using TOF LIDAR, measured distance from the sensor to object 10A and object 10B), 3C (input to signal analyzer 14 using encoded TOF LIDAR, measured distance from the sensor to object 10A and object 10B), 3D (autocorrelation of detected signal 30, obtained with encoded TOF LIDAR), and 3E (decoded output), LIDAR distance sensing instrument 2 emits output light pulse 24 towards object 10, comprising two reflective elements, object 10A and object 10B. Object 10A reflects some portion of output light pulse 24, while allowing a portion to pass though and reflect off object 10B. The interaction of output light pulse 24 with objects 10A and 10B contribute to reflected light pulse 26. This two element reflected light pulse 26 may be due to objects 10A and 10B being smaller than the beam width of output light pulse 24, or due to transparency of objects 10A and 10B which allow a portion of output light pulse 24 to interact with both objects. Reflected light pulse 26 comprises a sum of the light reflected off object 10A and object 10B, and is detected in LIDAR distance sensing instrument 2. TOF LIDAR signals allow for acquisition of waveforms that provide a variety of distance measurements from multiple reflective or scattering objects or partially reflective objects. Acquisition of a single complex TOF LIDAR waveform provides rich distance sense information to the user beyond a single range measurement. TOF LIDAR can measure multiple return pulses from a single output pulse. This allows for LIDAR to penetrate vegetation and other objects such as dust and snow. The encoded TOF LIDAR process retains the same capabilities.

Figure 3B:
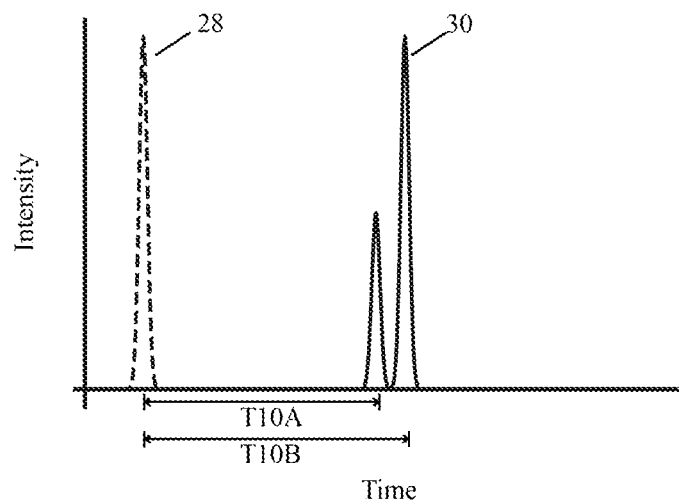

As shown in FIG. 3B, using TOF LIDAR, signal analyzer 14 has inputs of reference signal 28 and detected signal 30, which can measure the distance from LIDAR distance sensing instrument 2 to object 10A and 10B without need of decoding, according to formula (1). Each measurement with TOF LIDAR is performed using output light pulse 24 comprising of a single pulse. Because there are multiple objects reflecting the light, reference signal 28 is a single pulse and detected signal 30 has multiple peaks, which correspond to the number of objects that reflect light.

Figure 3C:
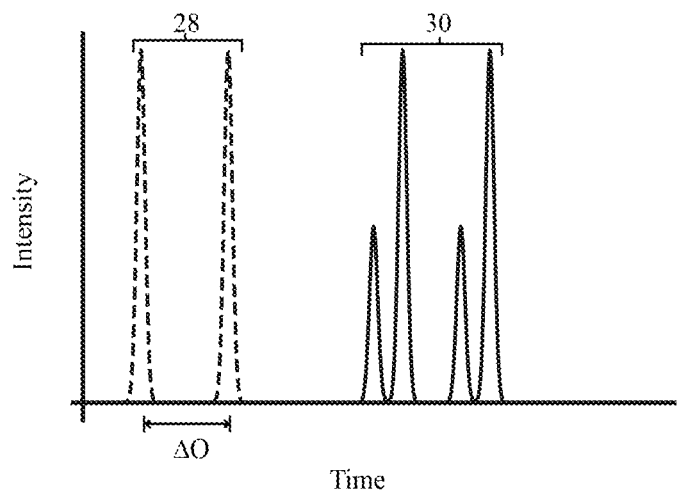

As shown in FIG. 3C, using encoded TOF LIDAR, signal analyzer 14 has inputs of reference signal 28 and detected signal 30, but requires decoding by signal analyzer 14 to determine the distance to objects according to formula (1). Each measurement with encoded TOF LIDAR, is performed using output light pulse 24 comprising of multiple pulses, where temporal spacing ΔO between pulses is known. Reflected light pulse 26 is measured comprising of multiple pulses, with twice the number of pulses compared to output light pulse 24, due to returns from object 10A and object 10B. Accordingly, reference signal 28 and detected signal 30 comprises multiple pulses.

Figure 3D:
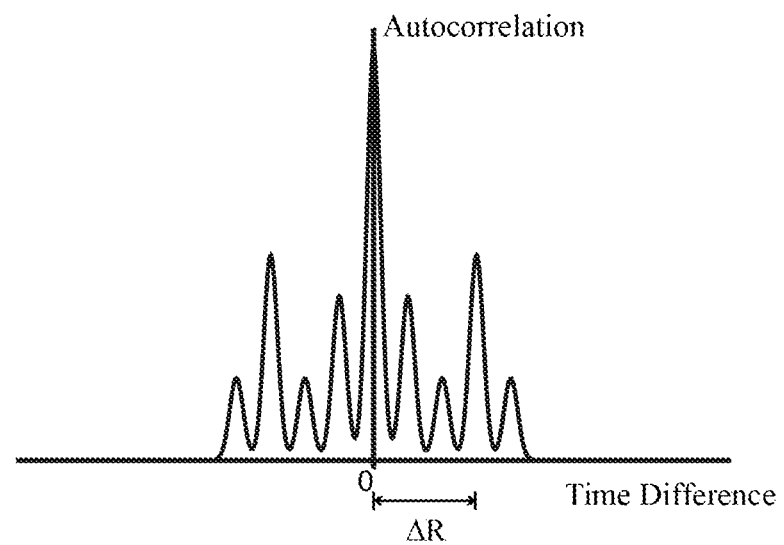

As shown in FIG. 3D, the autocorrelation of detected signal 30 has a local maximum away from 0 at temporal spacing ΔR.

Figure 3E:
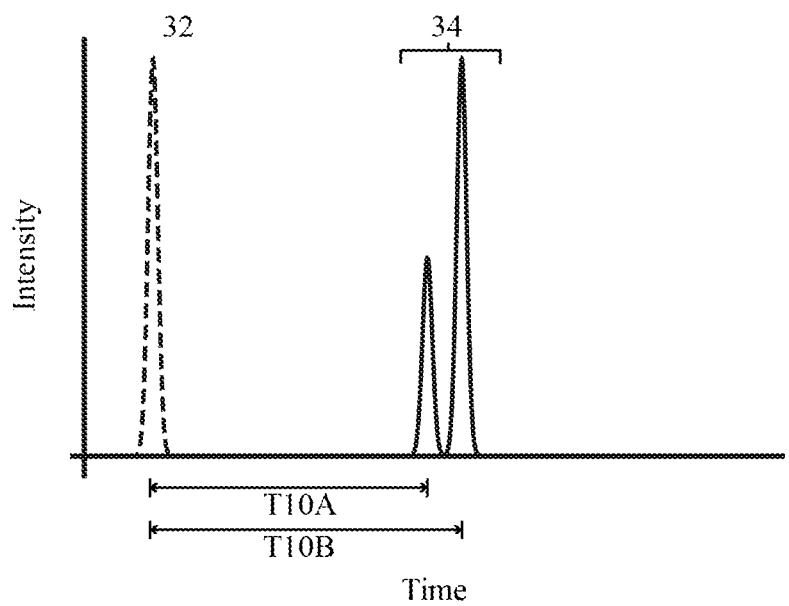

As shown in FIG. 3E, decoded output 32 and decoded input 34 are calculated. Temporal difference T10A and T10B is the difference between first pulse of output light pulse 24 and the respective pulses of the decoded signal.

Figure 4A:
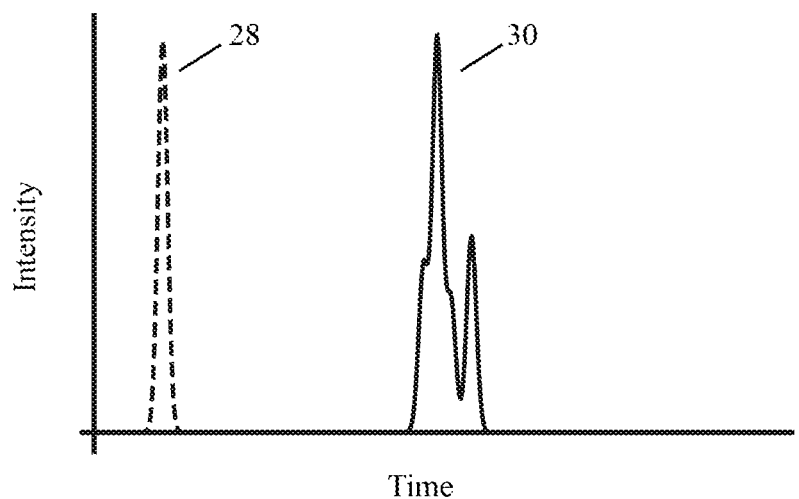
FIGS. 4A, 4B, 4C, and 4D show the decoding process of a complex reflection signal.

As shown in FIG. 4A, using TOF LIDAR, signal analyzer 14 has inputs of reference signal 28 and detected signal 30, which can measure the distance from LIDAR distance sensing instrument 2 to a complex environment without need of decoding, according to formula (1). Each measurement with TOF LIDAR is performed using output light pulse 24 comprising a single pulse. Due to the complex environment, multiple objects reflect output light pulse 24, which results in a complex waveform for detected signal 30. The distances of these multiple objects to LIDAR distance sensing instrument 2 can be determined from the temporal difference between the peak of reference signal 28 and each individual peak in detected signal 30.

Figure 4B:
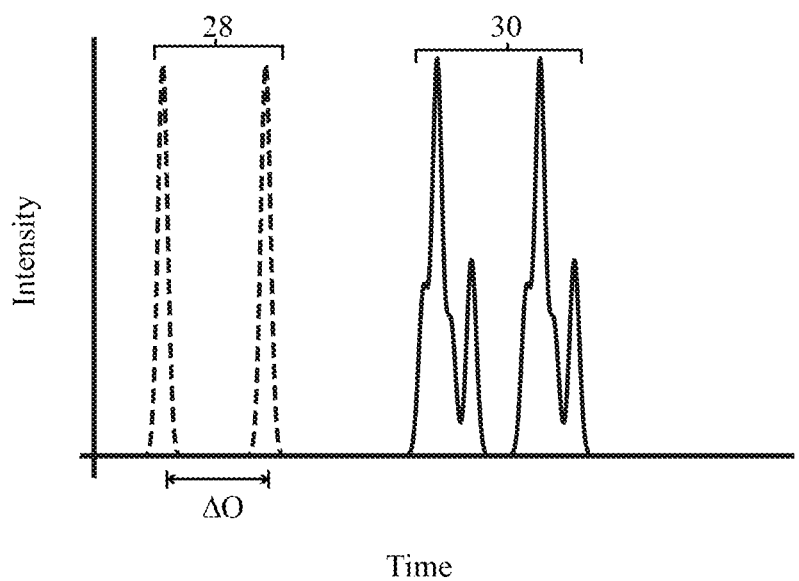

As shown in FIG. 4B, using encoded TOF LIDAR, signal analyzer 14 has inputs of reference signal 28 and detected signal 30, but requires decoding by signal analyzer 14 to determine the distance to objects according to formula 1. Each measurement with encoded TOF LIDAR, is performed using output light pulse 24 comprising of a multiple pulses, where temporal spacing ΔO between pulses is known. Reflected light pulse 26 is measured comprising of a complex waveform. Accordingly, reference signal 28 comprises multiple pulses and detected signal 30 comprises a complex waveform that needs to be decoded to measure the distance to objects.

Figure 4C:
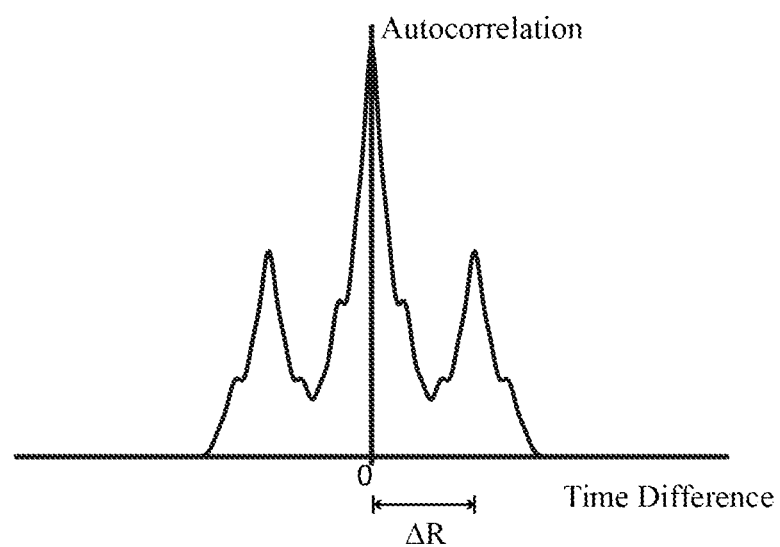

As shown in FIG. 4C, the autocorrelation function of detected signal 30 has a local maximum with temporal spacing ΔR away from 0. The value of temporal spacing ΔR is equal to the pulse separation of reference signal 28, temporal spacing ΔO. The approximate equality between these values determines the correspondence between reference signal 28 and detected signal 30.

Figure 4D:
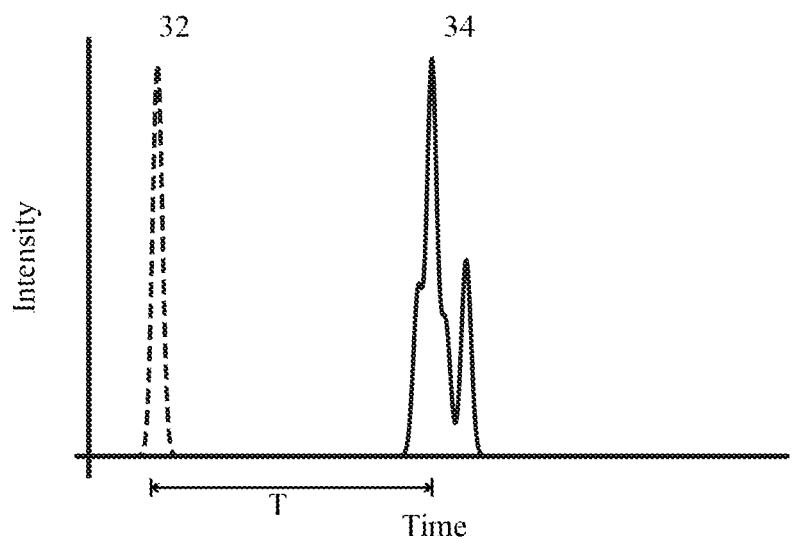

As shown in FIG. 4D, decoded output 32 and decoded input 34 are calculated. Temporal spacing T corresponding to the distance between LIDAR distance sensing instrument 2 and various distant objects.

Figure 5A:
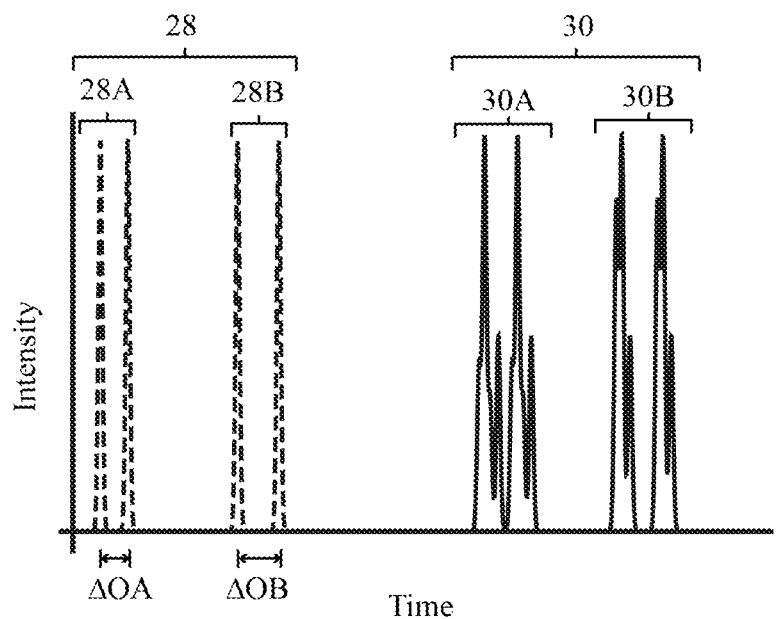
FIGS. 5A, 5B, 5C, and 5D show the decoding of multiple output pulses with the identification of each pulse.

As shown in FIG. 5A, using encoded TOF LIDAR, signal analyzer 14 has inputs of reference signal 28 and detected signal 30, where multiple distance measurements are performed concurrently, at a rate higher than the time it takes for reflected light to return to LIDAR distance sensing instrument 2. To determine the distance of objects from each measurement, each set of pulses in detected signal 30 needs to be matched to a set of pulses in reference signal 28. Once matched, each set of pulses can be decoded to determine the distance to objects according to formula (1). The sets of pulses are matched from the local maxima in the autocorrelations. The maxima in the autocorrelation of the set of pulses in detected signal 30 provide the values of the pulse spacing of the corresponding pulse set in reference signal 28.

Figure 5B:
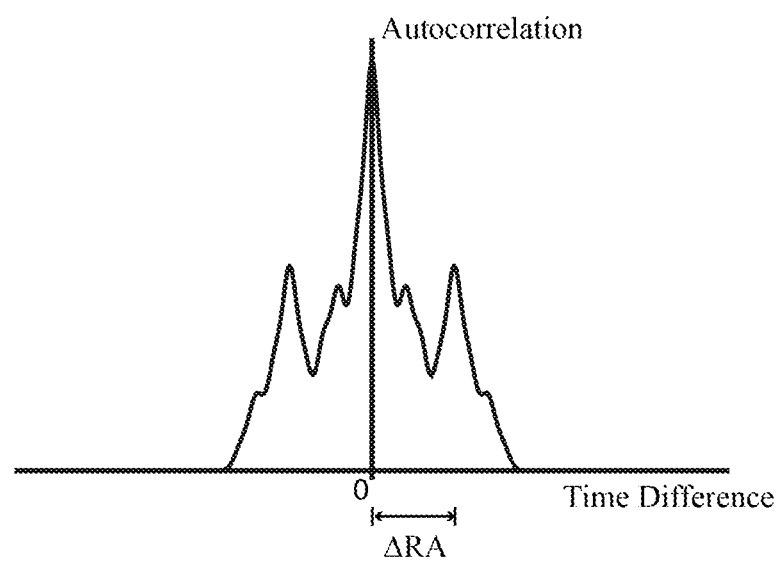

As shown in FIG. 5B, the autocorrelation of detected signal 30A has a local maximum at temporal spacing ΔRA. For this example, temporal spacing ΔRA is equal to temporal spacing ΔOA, thus mapping detected signal 30A to reference signal 28. The technique is not limited to the order of detected signal 30A and detected signal 30B or the order of reference signal 28A and reference signal 28B.

Figure 5C:
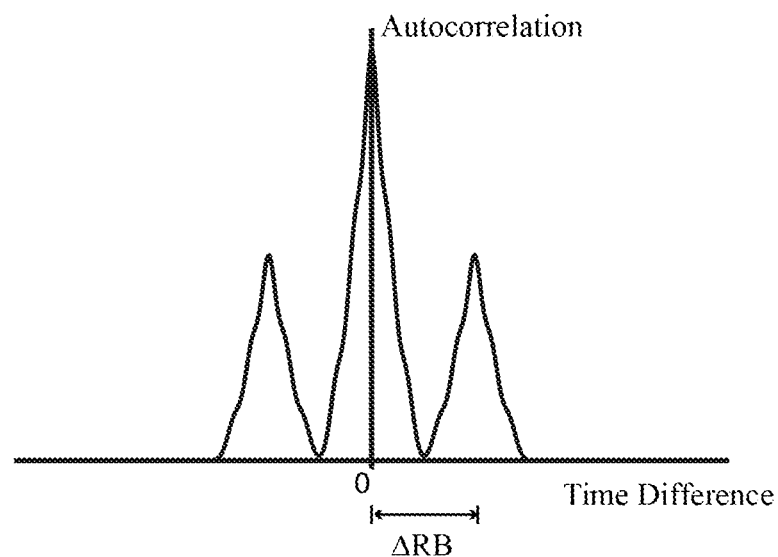

As shown in FIG. 5C, the autocorrelation of detected signal 30B has a local maximum at temporal spacing ΔRB. For this example, temporal spacing ΔRB is equal to temporal spacing ΔOB, thus mapping detected signal 30B to reference signal 28. The technique is not limited to the order of detected signal 30A and detected signal 30B or the order of reference signal 28A and reference signal 28B.

Figure 5D:
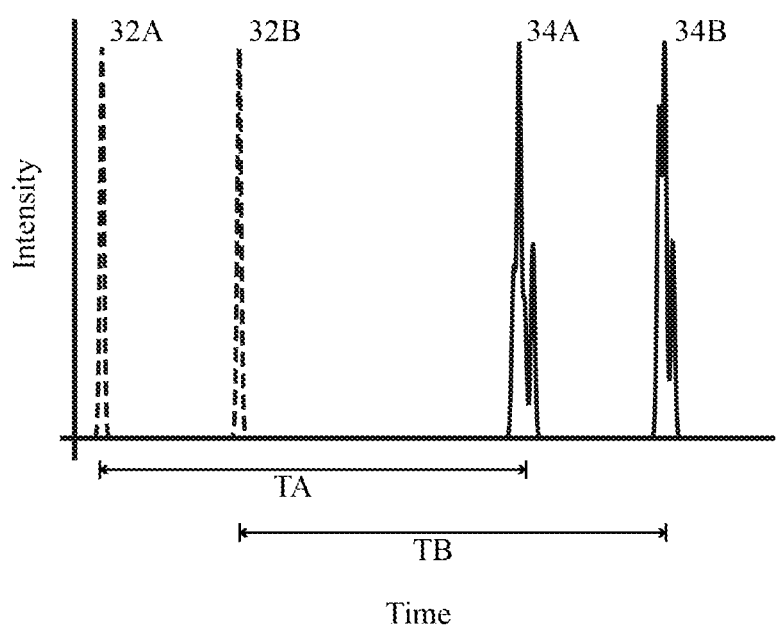

As shown in FIG. 5D, decoded output 32 and decoded input 34 are calculated. Decoded input 34 shows two sets of temporal separations, comprising of temporal spacing TA and temporal spacing TB. The set of temporal separations correspond to the distance of objects to LIDAR distance sensing instrument 2.

In addition to matching encoded pulses to reduce LIDAR distance measurement susceptibility to noise, the encoded LIDAR technique can reduce confusion between LIDAR sensors that emit pulses of light at the same wavelength. The confusion between LIDAR sensors projecting light of the same wavelength is avoided by having temporal spacing unique to each sensor.

Figure 6:
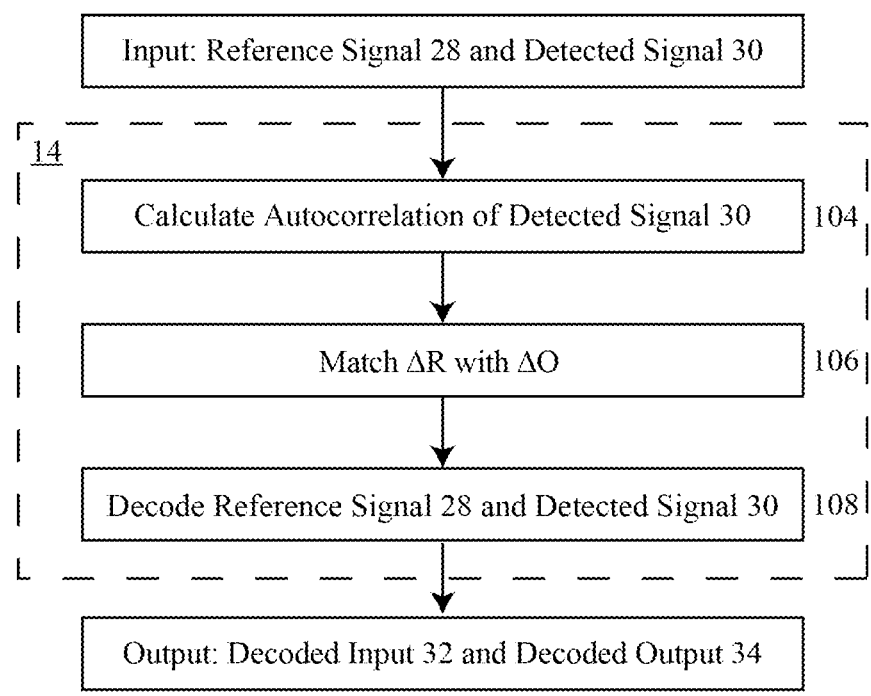
FIG. 6 show a flowchart of an exemplary embodiment of a pulse encoding method.

FIG. 6 is a flowchart of an exemplary embodiment of the procedure carried out by signal analyzer 14. Signal analyzer 14 accepts reference signal 28 and detected signal 30 as inputs from multiple distance measurements, decodes these inputs, and outputs decoded output 32 and decoded input 34 for multiple distance measurements. Certain exemplary embodiments can map detected signal 30 to reference signal 28. Certain exemplary embodiments can cause object 10 to be identified based upon mapped detected signal. At activity 104, signal analyzer 14 calculates the autocorrelation of detected signal 30, and finds temporal spacing ΔR from the local maxima away from 0. At activity 106, signal analyzer 14 finds a matching temporal spacing ΔR with temporal spacing ΔO from the total set of distance measurements. This produces a matched set of reference signal 28 with detected signal 30. Certain exemplary embodiments decode detected signal 30 and reference signal 28. Activity 108 takes this matched set and decodes the signals for output.

Certain exemplary embodiments can transmit decoded input 34 and decoded output 32 based upon detected signal 30 and reference signal 28. Certain exemplary embodiments can cause a rendering of a determined distance to an object of a plurality of objects (see, e.g., object 10A and object 10B of FIG. 3A). Wherein the distance to the object or plurality of objects is rendered based on a second formula d=cT/2, where T is a temporal separation between the decoded output signals and the decoded input signals and c is a known speed of light. Wherein the distance is determined based upon sets of pulses from a light source are matched from local maxima in autocorrelations. Wherein the local maxima in an autocorrelation of a set of pulses in a detected signal provides values of a pulse spacing of a corresponding pulse set in a reference signal. Wherein the reference signal and the detected signal are autocorrelated via a determination in accordance with a first formula:

$$R(\tau) = \int_{-\infty}^{\infty} s(t)s(t+\tau)dt$$

where s(t) is the intensity of detected signal 30 at time τ, and R(τ) is the autocorrelation. A first temporal spacing ΔR can be matched with a second temporal spacing ΔO between pulses, wherein ΔO is a known temporal spacing of the light pulses 24 from light source 8, and wherein ΔR is determined from a local maxima of the first formula:

$$R(\tau) = \int_{-\infty}^{\infty} s(t)s(t+\tau)dt.$$

Figure 7:
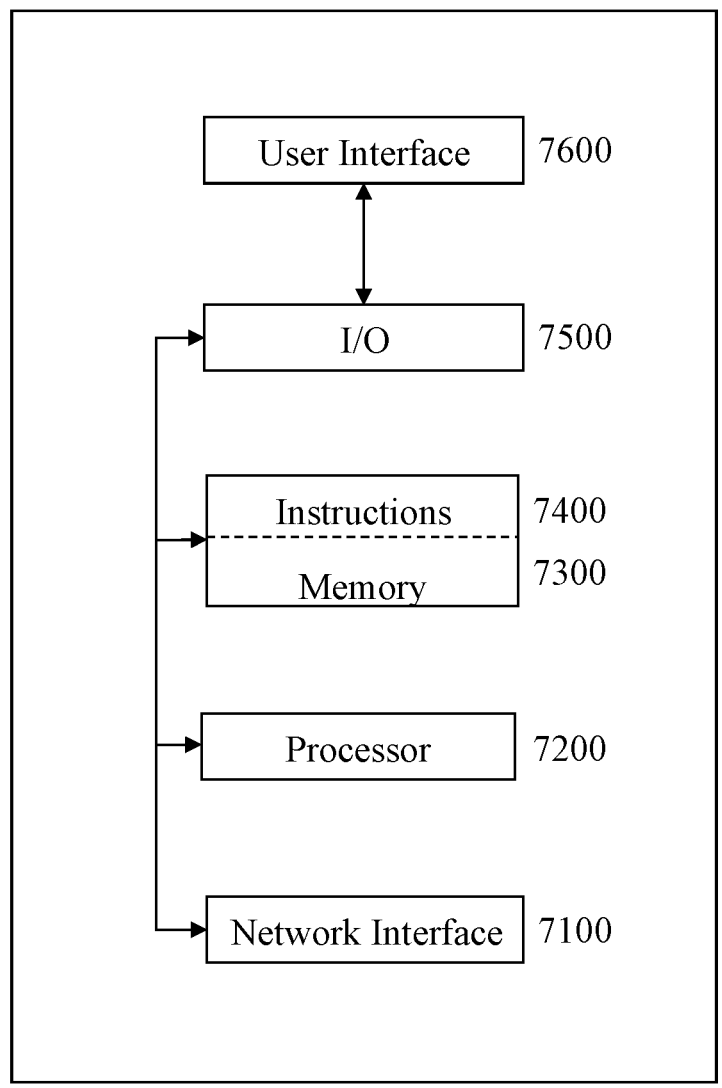
FIG. 7 is an exemplary embodiment of an information device 7000.

FIG. 7 is a block diagram of an exemplary embodiment of an information device 7000, which in certain operative embodiments can comprise, for example, processor 16 of FIG. 1. Information device 7000 can comprise any of numerous circuits and/or components, such as for example, one or more network interfaces 7100, one or more processors 7200, one or more memories 7300 comprising instructions 7400, one or more input/output (I/O) devices 7500, and/or one or more user interfaces 7600 coupled to one or more I/O devices 7500, etc.

In certain exemplary embodiments, via one or more user interfaces 7600, such as a graphical user interface, a user can view a rendering of information related to LIDAR distance sensing instruments and/or measurements.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
accordance—in conformance with.
activity—an action, act, step, and/or process or portion thereof.
analyze—to subject to mathematical and/or statistical analysis.
and/or—either in conjunction with or in alternative to.
apparatus—an appliance or device for a particular purpose.
array—a systematic arrangement of similar devices and/or systems.
associate—to join, connect together, and/or relate.
autocorrelate—to automatically correlate.
automatically—acting or operating in a manner essentially independent of external influence or control. For example, an automatic light switch can turn on upon "seeing" a person in its view, without the person manually operating the light switch.
can—is capable of, in at least some embodiments.
cause—to produce an effect.
circuit—an electrically conductive pathway and/or a communications connection established across two or more switching devices comprised by a network and between corresponding end systems connected to, but not comprised by the network.
comprising—including but not limited to.
configure—to make suitable or fit for a specific use or situation.
constructed to—made to and/or designed to.
convert—to transform, adapt, and/or change.
correlate—to establish a statistical relationship between two datasets.
create—to bring into being.
count—a numerical result of an adding discrete detected events.
couple—to join, connect, and/or link two things together.
data—distinct pieces of information, usually formatted in a special or predetermined way and/or organized to express concepts.
data structure—an organization of a collection of data that allows the data to be manipulated effectively and/or a logical relationship among data elements that is designed to support specific data manipulation functions. A data structure can comprise metadata to describe the properties of the data structure. Examples of data structures can include: array, dictionary, graph, hash, heap, linked list, matrix, object, queue, ring, stack, tree, and/or vector.
decode—to extract a meaning from a first signal and create a second signal based upon the meaning.
define—to establish the outline, form, or structure of.
detect—to sense a physical measurement.
detector—a device and/or system that senses a physical measurement.
determine—to obtain, calculate, decide, deduce, and/or ascertain.
device—a machine, manufacture, and/or collection thereof.
distance—a quantity of space between two things.
distinct—distinguished as not being the same; separate.
electrical—of or pertaining to energy in a form of moving electrons via a conductor.
equal—substantially the same as.
estimate—to calculate and/or determine approximately and/or tentatively.
focal plane array—a system comprising an array of distance measurement instruments.
formula—a mathematical equation.
generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard real time—of or relating to computer systems that provide an absolute deterministic response to an event. Such a response is not based on average event time. Instead, in such computer systems, the deadlines are fixed and the system must guarantee a response within a fixed and well-defined time within approximately five seconds of the event.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—a signal received by a device and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instrument—a device and/or system constructed to measure a present value of a quantity under observation.

intensity—a magnitude of a signal property.

LIDAR—a surveying method that measures distance to a target by illuminating that target with a pulsed light, and measuring the reflected light pulses with a sensor. Being an acronym for Light Imaging, Detection, And Ranging.

light source—a device and/or system from which luminous energy emanates.

local maxima—a largest value of the function, either within a given range (a local or relative extrema) or on the entire domain of a function (the global or absolute extrema).

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

map—to represent or transform.

match—to determine a correspondence with something.

may—is allowed and/or permitted to, in at least some embodiments.

medium—a substance through which light pulses are transmitted.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

multiprocessor—a device and/or system constructed to execute two or more programs or instruction sequences substantially simultaneously, such as via separate processors under integrated control.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

object—a tangible thing.

output—a signal in a form suitable for transmission.

peak—a highest magnitude of a signal and/or a value derived from a signal.

plurality—the state of being plural and/or more than one.

power supply—a source of electrical energy.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a representation of a series of pulses.

project—to calculate, estimate, or predict.

provide—to furnish, supply, give, and/or make available.

pulse—a momentary, sudden fluctuation in an optical signal.

receive—to get as a signal, take, acquire, and/or obtain.

recommend—to suggest, praise, commend, and/or endorse.

reference—a signal having a known temporal pulse spacing that is used for comparison to another signal in which the temporal pulse spacing is not be known.

reflect—to cast back light from a surface.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

responsive—reacting to an influence and/or impetus.

select—to make a choice or selection from alternatives.

sense—to detect a physical measurement.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

space—a temporal distance between pulses.

speed of light—299,792,458 meters per second.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

temporal—of or relating to time.

time difference—a temporal spacing between events.

transmit—to send as a signal, provide, furnish, and/or supply.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a magnitude, quantity, and/or number.

via—by way of and/or utilizing.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. An instrument comprising:
   a signal generator, the signal generator constructed to generate a temporally distinct profile of LIDAR pulses and provide the temporally distinct profile of LIDAR pulses to a light source;
   the light source, the light source coupled to the signal generator, the light source constructed to output corresponding light pulses with temporal spacing substantially equal to those of temporally distinct profile;
   a detector, the detector constructed to output a detected signal based upon reflected light pulses from an object, the reflected light pulses having a first temporal spacing, wherein the first temporal spacing is correlated to a second temporal spacing, wherein the second temporal spacing is of temporally distinct profile;
   a signal analyzer, the signal analyzer constructed to:
      generate a decoded output responsive to a reference signal;
      generate a decoded input responsive to the detected signal; and
      transmit the decoded input and the decoded output to a processor; and
   the processor, the processor constructed to cause a rendering of a distance to the object based upon the time difference between the peaks of the decoded output and the decoded input,
   wherein sets of pulses from the light source are matched from local maxima in autocorrelations, wherein the local maxima in an autocorrelation of a set of pulses in the detected signal provides values of a pulse spacing of a corresponding pulse set in the reference signal.

2. The instrument of claim 1, further comprising:
   the signal generator, the signal analyzer and the processor are comprised by a single multiprocessor.

3. The instrument of claim 1, further comprising:
   the instrument is comprised by a single multiprocessor.

4. The instrument of claim 1, further comprising:
   the reference signal is generated or triggered by the signal analyzer or the processor.

5. The instrument of claim 1, wherein:
   the reference signal and the detected signal are autocorrelated via a determination in accordance with a formula:

$$R(\tau) = \int_{-\infty}^{\infty} s(t)s(t+\tau)dt$$

where s(t) is an intensity of the detected signal at time t, and R(τ) is an autocorrelation.

6. The instrument of claim 1, wherein:
the reference signal and the detected signal are autocorrelated via a determination in accordance with a formula:

$$R(\tau) = \int_{-\infty}^{\infty} s(t)s(t+\tau)dt$$

where s(t) is an intensity of detected signal at time t, and $R(\tau)$ is an autocorrelation; and
the autocorrelation of the detected signal has a local maximum away from 0 at first temporal spacing $\Delta R$.

7. The instrument of claim 1, wherein:
an intensity of the decoded output, $D_{32}$, is determined via a calculation that uses a formula:

$$D_{32}(t) = \sqrt{s_{28}(t)s_{28}(t+\Delta O)}$$

where $s_{28}(t)$ is an intensity of the reference signal at time t and AO is the second temporal spacing.

8. The instrument of claim 1, wherein:
the intensity of the decoded input, $D_{34}$ is determined via a calculation that uses a formula:

$$D_{34}(t) = \sqrt{s_{30}(t)s_{30}(t+\Delta O)},$$

where $s_{30}(t)$ is an intensity of the detected signal at time t and AO is the second temporal spacing.

9. The instrument of claim 1, wherein:
a first determination of the distance to the object comprises:
a second determination that a count of reflected light pulses is a multiple of a count of light pulses output from the light source; and
a third determination, based upon a difference of the count of reflected light pulses and the count of light pulses, that the light pulses are reflected by a plurality of objects that comprises the object.

10. The instrument of claim 1, wherein:
the instrument is constructed to determine distances to each of a plurality of objects based upon the output of corresponding light pulses with temporal spacing substantially equal to those of the temporally distinct profile, the plurality of objects comprising the object.

11. The instrument of claim 1, wherein:
the distance to the object is determined based upon a formula d=cT/2n, where T is a measured time for a light pulse to travel from the light source, be reflected from the object, and return to the detector c is a known speed of light, and n is the index of refraction of the medium through which the light passes.

12. The instrument of claim 1, wherein:
the processor determines the distance to the object in hard real time relative to the receipt of the reflected light pulses at the detector.

13. A method comprising a plurality of activities, comprising: causing a rendering of a determined distance to an object of a plurality of objects, the distance determined from decoded output signals and decoded input signals, based upon sets of pulses from a light source are matched from local maxima in autocorrelations, wherein the local maxima in an autocorrelation of a set of pulses in a detected signal provides values of a pulse spacing of a corresponding pulse set in a reference signal, wherein the reference signal and the detected signal are autocorrelated via a determination in accordance with a first formula:

$$R(\tau) = \int_{-\infty}^{\infty} s(t)s(t+\tau)dt$$

s(t) is an intensity of detected signal 30 at time t, and $R(\tau)$ is the autocorrelation.

14. The method of claim 13, further comprising:
mapping the detected signal to the reference signal; and
causing the determined distance to the object to be identified based upon the mapped detected signal.

15. The method of claim 13, wherein:
matching a first temporal spacing $\Delta R$ with a second temporal spacing $\Delta O$ between pulses, wherein $\Delta O$ is a known temporal spacing of the pulses from the light source, and wherein $\Delta R$ is determined from the local maxima of the first formula:

$$R(\tau) = \int_{-\infty}^{\infty} s(t)s(t+\tau)dt.$$

16. The method of claim 13, further comprising:
decoding the detected signal and the reference signal from a temporal spacing determined by autocorrelation.

17. The method of claim 13, further comprising:
decoding the detected signal and the reference signal;
transmitting a decoded input and a decoded output based upon the detected signal and the reference signal.

18. The method of claim 13, wherein:
the distance to the object or plurality of objects is rendered based on a second formula d=cT/2n, where T is a temporal separation between the decoded output signals and the decoded input signals and c is a known speed of light, and n is the index of refraction of the medium through which the light passes.

19. The method of claim 13, wherein:
the distance to the object is determined at a first distance sensing instrument of a plurality of distance sensing instruments, the first distance sensing instrument an arrayed detector, the first distance sensing instrument in a focal plane array that acquires an array of distance measurements at substantially a single time.

* * * * *